No. 731,983. PATENTED JUNE 23, 1903.
S. M. VAUCLAIN.
STAY BOLT.
APPLICATION FILED JAN. 28, 1903.
NO MODEL.
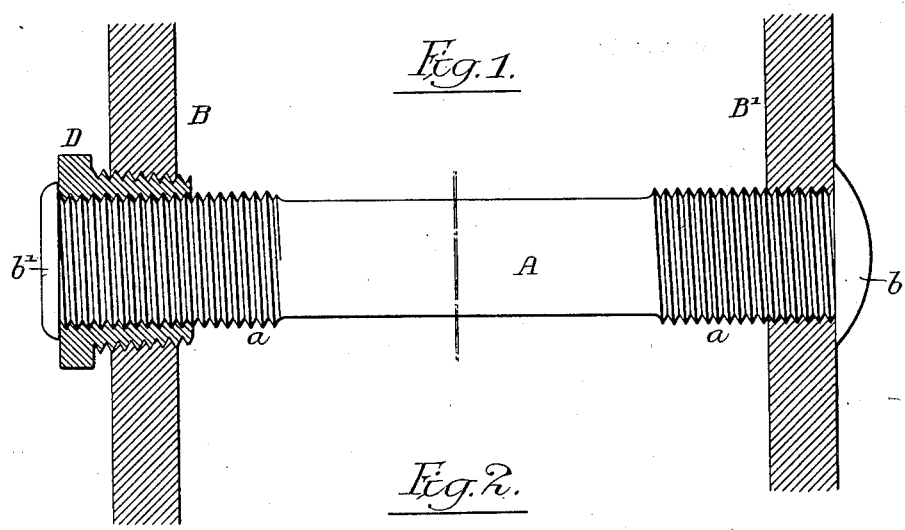
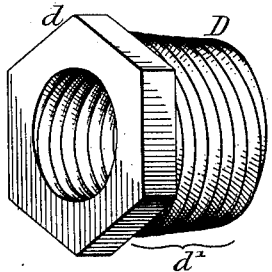
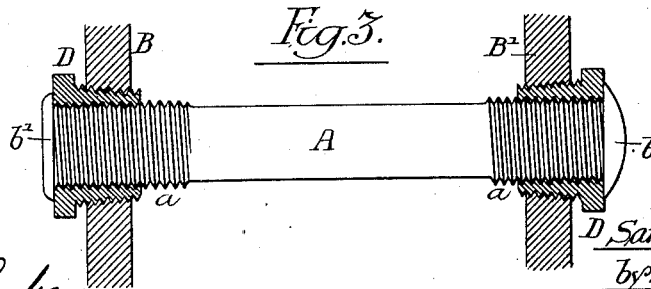
Witnesses:-
Frank L. A. Graham
Herman E. Metius
Inventor:-
Samuel M. Vauclain
by his Attorneys
Howson & Howson No. 731,983. Patented June 23, 1903.

UNITED STATES PATENT OFFICE.

SAMUEL M. VAUCLAIN, OF PHILADELPHIA, PENNSYLVANIA, ASSIGNOR TO BURNHAM, WILLIAMS & COMPANY, OF PHILADELPHIA, PENNSYLVANIA, A FIRM.

STAY-BOLT.

SPECIFICATION forming part of Letters Patent No. 731,983, dated June 23, 1903.

Application filed January 28, 1903. Serial No. 140,908. (No model.)

*To all whom it may concern:*

Be it known that I, SAMUEL M. VAUCLAIN, a citizen of the United States, residing in Philadelphia, Pennsylvania, have invented certain Improvements in Stay-Bolts, of which the following is a specification.

The object of my invention is to provide means for adjusting or tightening bolts used in staying the plates of boilers or other containers, so that in the event of a leak at the stay-bolt the parts can be so adjusted as to stop the leak. This object I attain in the following manner, reference being had to the accompanying drawings, in which—

Figure 1 is a sectional view of two boiler-plates with my improved stay-bolt connecting the same. Fig. 2 is a perspective view of the adjustable sleeve which I use, and Fig. 3 is a view of a modification.

A is a stay-bolt of the ordinary type, having the ends $a$ $a$ screw-threaded, as shown in the drawings. At one end of the stay-bolt is a head $b$ and at the other end a head $b'$.

B B' are the two plates of a boiler—such, for instance, as a locomotive-boiler. These plates must be supported at intervals by stay-bolts.

The ordinary method is to use a stay-bolt having a head at one end and screw-threaded at each end. When the stay-bolt is screwed into position, the projecting portion of the stay-bolt is flattened to form the other head, making a tight fit at each end against the plates. Leaks often occur at the stay-bolt, and it is a very difficult matter to stop the leak when the ordinary stay-bolt is used; but by the use of my invention the leak can be readily stopped.

As shown in Fig. 1, I use a sleeve D, having a head $d$, made hexagonal or of any shape, to receive a wrench or spanner, so that it can be turned, and having a tapered body $d'$, on which is a screw-thread. The sleeve D has a screw-threaded opening for the passage of the bolt A, the thread of the sleeve meshing with the thread of the bolt.

In the plate B is an opening of the same taper as the exterior surface of the sleeve D. The plate is screw-threaded, and the threads of the sleeve D mesh with the threads of the plate, as shown. The opening is of such a diameter in respect to the diameter of the sleeve that the sleeve will have a tight fit in the opening without the head coming in contact with the plate. After the bolt A is in place the projecting portion of the stay-bolt is preferably flattened to form the head $b'$ against the head $d$ of the sleeve.

The sleeve has a greater contact with the stay-bolt than it has with the plate. Consequently if any leak occurs it will be between the sleeve and the plate, and if such a leak occurs all that is necessary is to apply a suitable wrench to the head of the sleeve and give it a turn, so as to force the tapered sleeve into the tapered opening in the plate until the leak is stopped, the sleeve merely turning on the stay-bolt. The internal and external threads of the sleeve are of the same pitch, so that this adjustment can take place.

Leaks do not often occur between the stay-bolt and the plate B'; but in some instances I may use a sleeve at this end of the bolt as well as at the opposite end, as shown in Fig. 3.

This construction may be used at different points on the different stay-bolts of a boiler, and the end of the bolt opposite that on which the sleeve is mounted may be shaped to any form desired without departing from my invention.

I claim as my invention—

1. The combination of a stay-bolt having a screw-thread at one end, a plate having a screw-threaded tapered opening, a tapered sleeve having external threads meshing with the threads in the plate, and internal threads meshing with the threads of the bolt, the two sets of threads being of the same pitch so that the sleeve can be adjusted, substantially as described.

2. The combination of two plates each having a screw-threaded tapered opening, a sleeve mounted in each opening and internally and externally screw-threaded, a stay-bolt having a screw-thread at each end meshing with the internal threads of the sleeves, substantially as described.

In testimony whereof I have signed my name to this specification in the presence of two subscribing witnesses.

SAMUEL M. VAUCLAIN.

Witnesses:
 FRED. WOOLLVEN,
 WM. DE KRAFFT.